US008477779B1

(12) United States Patent
Colloff et al.

(10) Patent No.: US 8,477,779 B1
(45) Date of Patent: *Jul. 2, 2013

(54) METHOD AND SYSTEM FOR RELIABLE MULTICAST

(75) Inventors: Ian G. Colloff, Los Gatos, CA (US); Lloyd Dickman, Cupertino, CA (US); Thomas R. Prohofsky, Edina, MN (US); James A. Kunz, Plymouth, MN (US)

(73) Assignee: Intel Corporation, Santa Clara, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/084,421

(22) Filed: Apr. 11, 2011

Related U.S. Application Data

(63) Continuation of application No. 11/948,897, filed on Nov. 30, 2007, now Pat. No. 7,936,753.

(51) Int. Cl.
*H04L 12/28* (2006.01)
*H04L 12/56* (2006.01)

(52) U.S. Cl.
USPC .......................................... 370/390; 370/392

(58) Field of Classification Search
None
See application file for complete search history.

(56) References Cited

U.S. PATENT DOCUMENTS

| | | | |
|---|---|---|---|
| 5,459,725 A | 10/1995 | Bodner et al. | |
| 5,541,927 A * | 7/1996 | Kristol et al. | 370/408 |
| 5,959,989 A | 9/1999 | Gleeson et al. | |
| 6,990,098 B1 * | 1/2006 | Eberle et al. | 370/390 |
| 2002/0110139 A1 * | 8/2002 | Boura et al. | 370/432 |
| 2007/0230493 A1 * | 10/2007 | Dravida et al. | 370/412 |
| 2008/0267183 A1 * | 10/2008 | Arndt et al. | 370/390 |

OTHER PUBLICATIONS

"Notice of Allowance from USPTO dated Mar. 11, 2011 for U.S. Appl. No. 11/948,897".
"Final Office Action received from USPTO dated Sep. 14, 2010 for U.S. Appl. No. 11/948,897".
"Office Action from USPTO dated Apr. 1, 2010 for U.S. Appl. No. 11/948,897".

* cited by examiner

*Primary Examiner* — Chirag Shah
*Assistant Examiner* — Srinivasa Reddivalam
(74) *Attorney, Agent, or Firm* — Blakely, Sokoloff, Taylor & Zafman LLP

(57) ABSTRACT

Method and system for transmitting a multicast message with one or more packets to a plurality of destinations is provided. The system includes an adapter including an entry port to receive the multicast message from a source for transmission to the plurality of destinations; one or more egress ports of the adapter that transmit one or more packets of the multicast message to the plurality of destinations and receives acknowledgement for the one or more packets from the one or more destinations; and a message manager that monitors the delivery status for one or more packets to the plurality of destinations without using a plurality of dedicated individual connections between each of the plurality of destinations and the source.

24 Claims, 8 Drawing Sheets

| Missed ACK | 414 |
| --- | --- |
| PSN Error (Endpoint) | 416 |
| Link Down (Endpoint) | 418 |
| Link Down (Router) | 420 |
| Link Down (Switch) | 422 |
| Timeout (Endpoint) | 424 |
| Timeout (Router) | 426 |
| Timeout (Switch) | 428 |

| Count of members ACK | 430 |
| --- | --- |
| Count of PSN error | 432 |
| Count of timeouts (endpoint) | 434 |
| Count of link-down (endpoint) | 436 |
| Count of timeout (Switch/Router) | 438 |
| Count of link-down (Switch/Router) | 440 |

METHOD AND SYSTEM FOR RELIABLE MULTICAST

CROSS-REFERENCE TO RELATED APPLICATION

This application is a continuation of application Ser. No. 11/948,897, filed on Nov. 30, 2007 now U.S. Pat. No. 7,936,753, the entire contents of which are hereby incorporated by reference.

TECHNICAL FIELD

The present invention relates to networks, and more particularly, to a system and method to provide reliable multicast over a network fabric.

RELATED ART

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets.

There are various standards/architectures that define physical and logical rules for network communication. The Infini-Band ("IB") Architecture is one such architecture. IB defines a network system for connecting multiple independent processor platforms, I/O (input/output) platforms, and I/O devices. An IB based network system typically includes processor nodes and I/O units (each referred to as "IB unit" for convenience) connected via an IB fabric of cascaded switches (connecting within a subnet) and IB routers (connecting IB subnets).

Continuous efforts are being made for an efficient reliable multicast system and method for use in networked systems to send multicast messages larger than a maximum transmission unit ("MTU") size across network subnets.

SUMMARY

In one embodiment, an adapter for transmitting a multicast message received from a source to multiple destinations, the message including one or more packets is disclosed. The adapter includes an entry port that receives the multicast message from a source for transmission to the plurality of destinations; at least one egress port that transmits one or more packets of the multicast message to the plurality of destinations and the at least one egress port receives an acknowledgement for one or more packets from one or more destinations; and a message manager that monitors delivery status for the one or more packets of the multicast message to the plurality of destinations without using a plurality of dedicated individual connections between each of the plurality of destinations and the source.

In another embodiment, method of transmitting multicast message to multiple destinations from a source, the message including one or more packets is disclosed. The method includes receiving the multicast message from a source at an entry port of the adapter for transmission to the plurality of destinations; transmitting one or more packets of the multicast message through one or more egress ports to the plurality of destinations and receiving an acknowledgement for one or more packets from one or more of the plurality of destinations; and monitoring delivery status for one or more packets to the plurality of destinations, wherein a message manager monitors the delivery status without using a plurality of dedicated individual connections between each of the plurality of destinations and the source.

In yet another embodiment, a system for transmitting a multicast message received from a source to multiple destinations, the message including one or more packets is disclosed. The system includes an adapter including an entry port to receive the multicast message from a source for transmission to the plurality of destinations; one or more egress ports of the adapter that transmit one or more packets of the multicast message to the plurality of destinations and receives acknowledgement for the one or more packets from the one or more destinations; and a message manager that monitors the delivery status for one or more packets to the plurality of destinations without using a plurality of dedicated individual connections between each of the plurality of destinations and the source.

This brief summary has been provided so that the nature of the invention may be understood quickly. A more complete understanding of the invention can be obtained by reference to the following detailed description of the various embodiments thereof concerning the attached drawings.

BRIEF DESCRIPTION OF THE DRAWINGS

The foregoing features and other features of the present invention will now be described with reference to the drawings of the various embodiments. In the drawings, the same components have the same reference numerals. The illustrated embodiments are intended to illustrate, but not to limit the invention. The drawings include the following Figures.

DETAILED DESCRIPTION

Figure 1A:
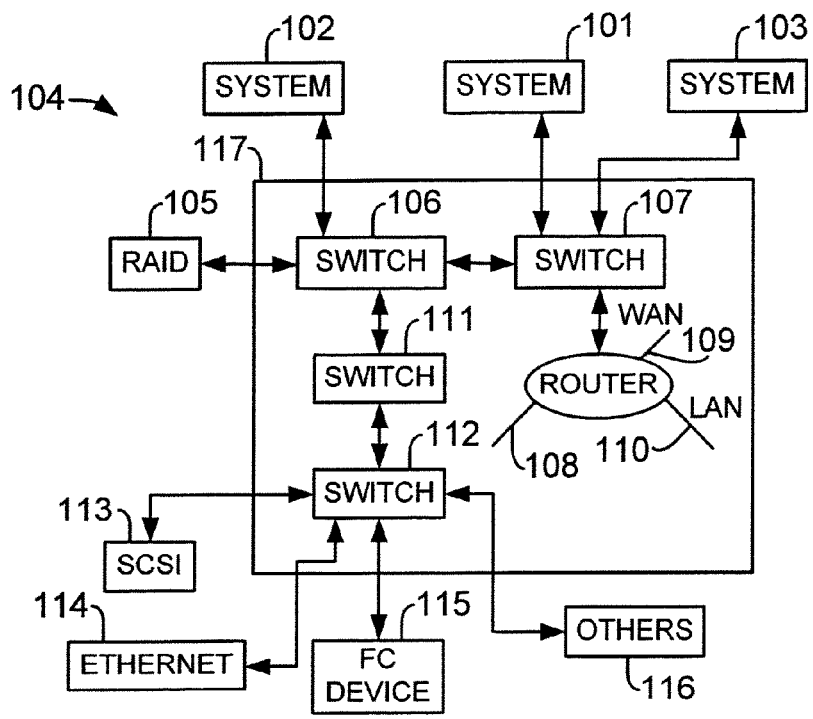
FIG. 1A shows a block diagram of a network system, according to one embodiment.

In one embodiment, an adapter for transmitting a multicast message to a plurality of destinations is disclosed. The multicast message is received from a source (port or device (used interchangeably throughout this specification) and includes one or more packets. The adapter includes an entry port that receives the message from the source for transmission to multiple destinations; one or more egress ports that transmits one or more packets of the message to multiple destinations and receives acknowledgement for one or more packets from one or more destinations. The adapter also includes a message manager that monitors the delivery status for one or more packets to the multiple destinations. The message manager returns a single acknowledgement to the source. The multicast messages are sent and managed without using dedicated individual connections between the source In another embodiment, a reliable multicast (RMC) data packet, RMC Confirmation (or Confirm) packet, RMC Ack (acknowledged) packet and RMC Nack (not acknowledged) packet for use with an embodiment of the disclosure are also disclosed. Furthermore, a data structure is provided to monitor and track the status of the RMC data packets.

In yet another embodiment, a method for transmitting a multicast message (including one or more packets) to multiple destinations from a source is disclosed. The method includes receiving the message from the source at an entry port of an adapter for transmission to multiple destinations; transmitting one or more packets of the message through one or more egress ports to multiple destinations and receiving acknowledgement for one or more packets from one or more destinations; and monitoring the delivery status for one or more packets to multiple destinations by a message manager. The message manager returns a single acknowledgement to the source.

In yet another embodiment, a system for transmitting a multicast message (including one or more packets) received from a source to multiple destinations. The system includes an adapter that includes an entry port to receive the message from the source for transmission to multiple destinations; one or more egress ports that transmits one or more packets of the message to multiple destinations and receives acknowledgement for one or more packets from one or more destinations; and a message manager that monitors the delivery status for one or more packets to multiple destinations. The message manager returns a single acknowledgement to the source.

DEFINITIONS

The following definitions are provided for convenience as they are typically (but not exclusively) used in IB and the general networking environment, implementing the various adaptive aspects described herein.

"DLID": Destination local identifier is a field in an IB packet for identifying a local subnet packet destination.

"Global Identifier" (GID): GID is an identifier used to identify a port on a channel adapter, a port on a router, or a multicast group. GID is typically present in a Global Route Header (GRI). The GRH may be used within a subnet and/or when a packet is to be delivered outside of an originator's (or source) local subnet.

"Local Identifier" (LID): LID is an address assigned to a port, which is unique within a subnet. LID is used for directing packets within the subnet.

"Multicast GID" (MGID): MGID is an identifier used to identify a multicast group.

"Multicast Local ID" (MLID): MLID is an identifier used to identify a multicast local port. MLID may be local to a subnet.

"Multicast routing table (MRTABLE): The MRTABLE includes a bit mask of ports that are part of a multicast group defined by MLID.

"Opcode": Opcode is a field in an IB packet that indicates an IB packet type and operation.

"Packet": A group of one or more network data word(s) used for network communication.

"QP": Destination queue pair (QP) is a field in an IB packet that indicates the work queue pair number at a destination. For multicast packets, the QP value is set to all one's (ex: 11111111), and for datagrams, source QP value is placed in the datagram extended header (DETH).

"Router": A device that facilitates network communication conforming to IB and other switch standards/protocols for communication between subnets.

"Routing Table": A table that stores information for routing a packet.

"SLID": Source local identifier is a field in an IB packet identifying local subnet packet source.

"Source Global ID" (SGID): SGID is a global identifier for a source, which is unique across subnets.

"Switch": A device that facilities network communication conforming to IB and other switch standards/protocols within a subnet.

"Virtual Lane" (VL): The term VL as defined by Section 3.5.7 of the IB Specification provides a mechanism for creating virtual links within a single physical link. A virtual lane represents a set of transmit and receive buffers in a port. A data VL is used to send IB packets and according to the IB Specification, configured by a subnet manager based on a Service Level field in a packet.

To facilitate an understanding of the various embodiments, the general architecture of an IB networking system will be described. The specific architecture and operation of the various embodiments will then be described with reference to the general architecture.

IB Structure:

IB is a switched fabric interconnect standard for servers and high performance clusters. IB technology is deployed for server clusters/enterprise data centers ranging from two to thousands of nodes. The IB standard is published by the IB Trade Association, and is incorporated herein by reference in its entirety.

An IB based network system may include processor nodes and I/O units (each referred to as IB unit for convenience) connected through an IB fabric made up of cascaded switches (connecting within a subnet) and IB routers (connecting IB subnets). An IB based network may be subdivided into subnets interconnected by routers. Each IB node or switch may attach to a single or multiple switches or directly with each other. Each IB unit interfaces with the fabric through one or more ports in an adapter (for example, a Target Channel Adapters (TCA) or a Host Channel Adapter (HCA). The IB specification supports multiple adapters per IB unit with each adapter providing one or more ports that connect to the fabric. Each port of an adapter of an IB unit appears as a node to the fabric.

The ports are endpoints to which data is sent (for example, ports of a Target Channel Adapter or a Host Channel Adapter). However, each port may include multiple QPs (Queue Pairs) that may be directly addressed from a remote peer. The QP number (QPN) may be used as part of an address during data transfer.

IB Architecture supports both connection-oriented and datagram service between IB unit ports. The peers are identified by QPN and port identifier values (Port_IDs). QPNs are not used to define the destination when packets are multicast. A switch may support multicasting, which mean when a packet is received from a source, the packet is replicated and transmitted across multiple output ports. A multicast group is typically identified by MGID.

There are various methods defined by the IB specification to transmit packets. For example, Unreliable Datagram (unacknowledged—connectionless) Service, Reliable Datagram (acknowledged—multiplexed) Service, Unreliable Connected (unacknowledged-connection oriented), and Unreliable Connected (unacknowledged-connection oriented) that are described below.

Unreliable Datagram (unacknowledged—connectionless) Service: The Unreliable

Datagram (UD) service is connectionless and unacknowledged. It allows a QP to communicate with any unreliable datagram QP on any node with the same QKey. Per the IB Architecture, the UD packet size is limited to the maximum transmission unit (MTU) and the MTU is limited to 4096 bytes.

Reliable Datagram (acknowledged—multiplexed) Service: The Reliable Datagram (RD) service is multiplexed over connections between nodes called End-to-End Contexts (EEC), which allow each RD QP to communicate with any RD QP on any node with an established EEC. Multiple QPs can use the same EEC and a single QP can use multiple EECs.

Reliable Connected (acknowledged—connection oriented) Service: The Reliable Connected (RC) service associates a local QP with one remote QP via a dedicated connection.

Unreliable Connected (unacknowledged-connection oriented): The Unreliable Connected (UC) service associates one local QP with one remote QP. There is no acknowledgement and hence lost or corrupted packets are not resent. Such packets are therefore simply dropped. In other aspects, it is similar to RC.

The IB Architecture specifies the use of single packet Unreliable Datagram (UD) for IB multicast packets. As stated above, each UD packet size is limited to the MTU size. Further, the UD service is structured to send only a single packet message and cannot be used to send messages that include multiple packets. Furthermore, the UD service is not reliable, because the UD service does not provide for acknowledgements from destination end points to a source upon receipt of a UD service multicast message.

Per the IB standard, one way to achieve reliable multicast is by establishing multiple individual RC service connections between a source endpoint and multiple endpoints of a multicast group. In this approach, a source QP has to communicate with multiple remote QPs on a dedicated connection oriented basis for transmitting a single RC service multicast packet. This burdens the source system and hence is inefficient. Therefore, the standard IB solution for reliable multicast is commercially undesirable. The various embodiments disclosed herein solve this problem.

Network System/Packet Structure:

FIG. 1A shows a block diagram for network system 104 with various devices. System 104 includes a fabric 117, which includes plural switches 106, 107, 111 and 112 for moving network packets. Fabric 117 also includes a router 108 that is coupled to a wide area network 109 and local area network 110.

Switch 106 is operationally coupled to a RAID storage system 105 and system 102, while system 101 and 103 may be operationally coupled to switch 107.

Switch 112 may be coupled to a small computer system interface ("SCSI") port 113 that is coupled to SCSI based devices (not shown). Switch 112 may also be coupled to an Ethernet port 114, Fibre Channel device (s) 115 and other device(s) 116.

Systems 101-103 typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system. Host systems typically use HCAs (not shown) to connect to an IB Fabric. QLogic Corporation, the assignee of this present application designs and sells HCAs.

Figure 1B:
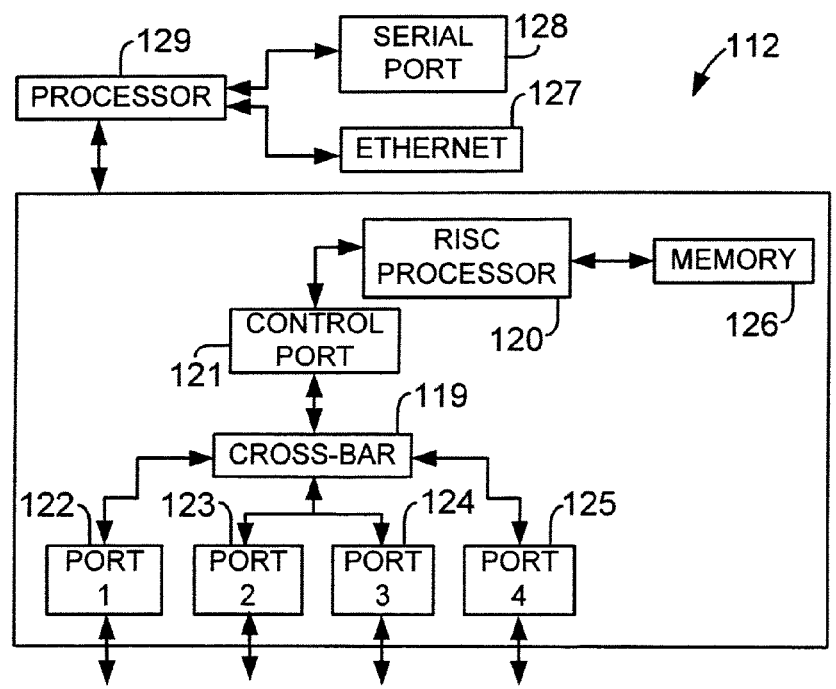
FIG. 1B shows a block diagram of a switch using the system, according to one embodiment.

FIG. 1B shows a block diagram of switch 112 that includes a processor 120, which is operationally coupled to a plurality of ports, for example, 122, 123, 124 and 125 via a control port 121, and crossbar 119. In one embodiment, processor 120 may be a reduced instruction set computer (RISC) type microprocessor.

Switch 112 may be coupled to an external processor 129 that is coupled to an Ethernet port 127 and serial port 128. In one aspect of the present invention, processor 129 may be a part of computing systems 101-103. An administrator to configure switch 112 may use processor 129.

Figure 2A:
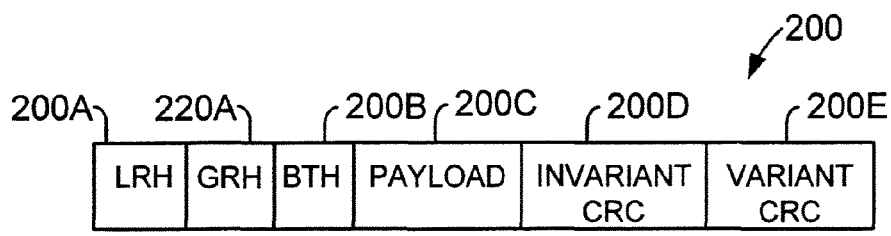
FIG. 2A shows an example of a network packet structure, used according to one embodiment.

FIG. 2A provides an example of a packet structure (or format) that may be used in the various embodiments described herein. Packet structure 200 includes a GRH 220A, LRH 200A, a base transport header (BTH) 200B, packet payload 200C, invariant cyclic redundancy code (CRC), and variant CRC 200E. Packet structure 200 is also described in IB Architecture Specification, Volume 1, Chapter 6, titled "Data Packet Format", incorporated herein by reference in its entirety.

Figure 2B:
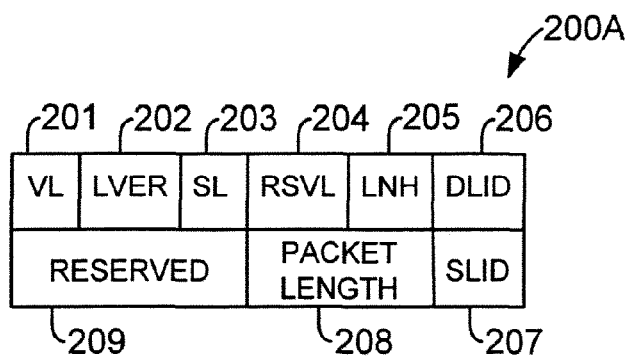
FIG. 2B shows a block diagram of a local route header (LRH) in the packet structure of FIG. 2A, used according to one embodiment.

FIG. 2B shows a block diagram of LRH 200A, which includes a plurality of fields for local routing by switches within an IB subnet. LRH 200A includes a virtual lane (VL) field 201 that identifies which receive buffer and flow control credits should be used for processing a received packet, link version (Lver) field 202 specifies the version of the LRH packet 200A, service level (SL) field 203 is used by switch 112 to determine a transmit VL for a packet, and link next header (LNH) field 205 specifies what header follows the LRH 200A. The LNH field 205 in LRH 200A indicates the presence of GRH 220A. Field 209 is a reserved field.

LRH 200A further includes a destination local identifier (DLID) field 206 that specifies the port to which switch 112 delivers the packet and source identifier (SLID) field 207 that indicates the source of the packet. Packet length field 208 specifies the number of words included in a packet.

Figure 2C:
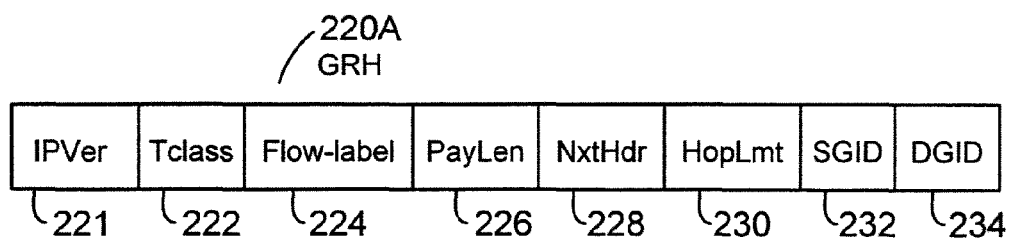
FIG. 2C shows a block diagram of a global route header (GRH) used in multicast packets, or packets that cross multiple subnets, according to one embodiment.

FIG. 2C shows a block diagram of global route header (GRH) 220A, where GRH 220A includes a plurality of fields for routing packets between IB subnets. GRH 220A includes (a) a IP Version (IPVer) field 221 that identifies the version of the GRH 220A; (b) Traffic Class (Tclass) field 222 which is used by the IB architecture to communicate global service level; (c) Flow Label (Flow-label) field 224 which identifies packet sequences that may need special handling; (d) payload length (PayLen) field 226, which specifies the number of bytes starting from the first byte after the GRH, up to and including the last byte of the invariant CRC (200D) and (e) Next Header (NxtHdr) field 228, which identifies a header following the GRH. GRH 220 further includes (i) a Hop Limit (HopLmt) field 230 which limits the number of hops a packet can make between subnets, before the packet is discarded, (ii) Source GID (SGID) field 232, which identifies the Global Identifier (GID) for the port that injected the packet into the network and (iii) a Destination GID (DGID) field 234, which identifies the GID for the port that will consume the packet from the network.

Figure 3:
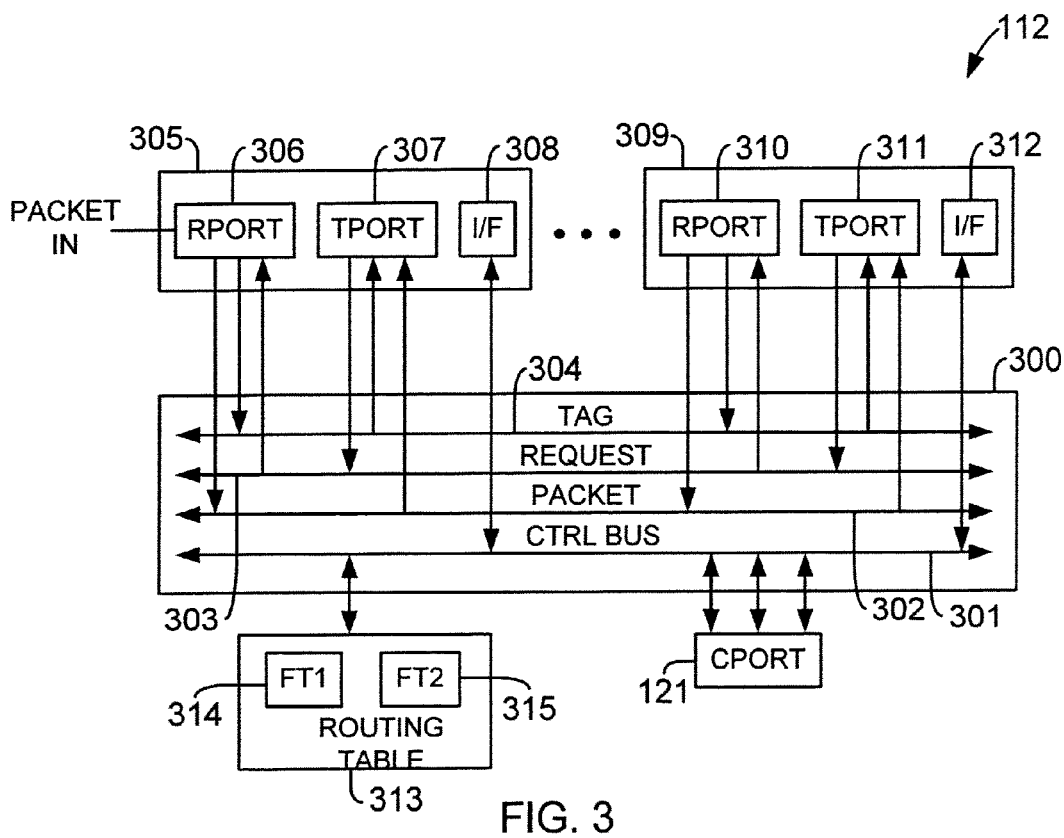
FIG. 3 shows another block diagram of a switch according to one embodiment.

FIG. 3 shows yet another block diagram of switch 112 in a switch fabric 300. Switch fabric 300 is operationally coupled to CPORT 121 and plural ports 305 and 309. It is noteworthy that ports 305 and 309 are similar to ports 122-125. Switch fabric 300 includes a packet data crossbar 302, packet request crossbar 303 and packet tag crossbar 304 and a control bus 301.

Packet data crossbar 302 connects receive ports (306, 310), transmit ports (307,311), and can concurrently transmit plural packets via plural VLs. Packet Tag crossbar 303 is used to move plural packet tags from receive ports (306, 310) to transmit ports (307, 311). Packet request crossbar 303 is used by transmit port (307, 311) to request a particular packet from a receive buffer.

Unicast Routing table (URTABLE) 313 is used to map DLID from a LRH 200A to one or more output ports. A forwarding table 314 (and 315) includes look up tables (LUTs) that service ports 305 and 309. Ports 305 and 309 (also referred to as XPORT) are a part of switch 112. Interface (I/F) 308 and 312 provide input/output interface to switch 112.

A port is typically identified by a LID and optionally by a GID. The GID in a packet is used for communicating across an IB subnet or multicast flows. The LID field is a 16-bit value that is assigned when a port becomes active. A LID is used in a packet to determine a destination within a subnet.

The GID may be 128 bits long and may be formed by concatenating a 64-bit IB subnet prefix and a 64-bit EUI-64-compliant portion. The EUI-64 portion of a GID is referred to as the Global Unique Identifier (GUID); where EUI stands for Extended Unique Identifier. The GUID is a persistent identifier for a port. However, the GUID alone may not be used as an address in a packet for transmission across subnets, as the GID changes when an IB subnet prefix is modified.

The GID and LID assignment is performed by or via a subnet manager (SM). Every IB subnet has at least one SM component that controls and configures the overall fabric. The SM and a related component, the subnet administrator (SA), are a central repository for information to set-up and initialize the fabric. The SM programs fabric switches for routing packets between destinations. The switches use address decoders to decode addresses for routing packets to their destination.

IB routers route packets between IB subnets based on the GIDs, which may be included in the GRH field. An IB subnet a packet within a subnet may or may not include a GID, but when a packet traverses across an IB subnet, the GID I included with the subnet information, as previously described.

Figure 4A:
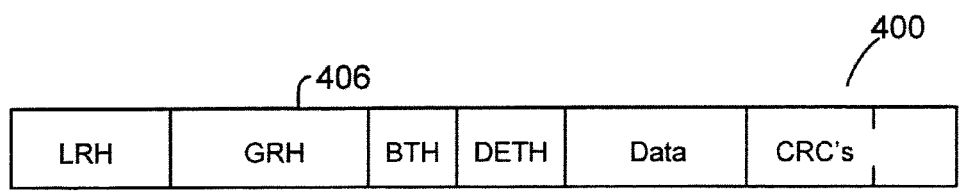
FIGS. 4A-4E shows Reliable Multicast (RMC) packet format for use with an embodiment of the disclosure.
Figure 4B:
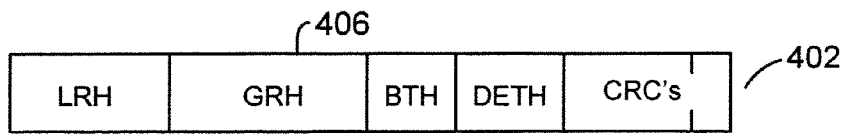
Figures 4C, 4D, 4E:
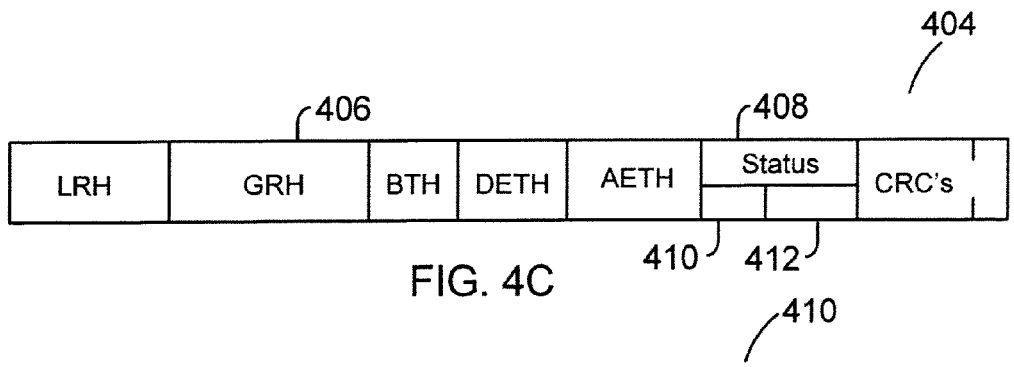

RMC Packet Structure:

In one embodiment, a Reliable Multicast (RMC) Packet format is provided. The RMC packet format may be used with one or more embodiments of this disclosure. Examples of RMC packet formats are shown in FIGS. 4A-4C. FIG. 4A shows a RMC data packet 400. FIG. 4B shows a RMC Confirmation packet (also referred to as RMC Confirm packet) 402 and FIG. 4C shows a RMC Ack packet and RMC Nack packet (RMC Ack/Nack packet) 404. FIGS. 4D and 4E shows details of certain fields in RMC Ack/Nack packet 404.

Now referring to FIGS. 4A-4C, GRH 406 is a global routing header for a RMC multicast packet. GRH 406 may include a) SGID, which may be constructed as a Link-local Unicast GID (local within a Subnet); b) a Site-local unicast GID that may cross multiple subnets, and is unique within a site environment, or c) a unique Global address which is visible outside the site (i.e. across an enterprise or the Internet). The Global address may also be used to identify a path within a site.

GRH 406 may further include a DGID. In one embodiment, the DGID in GRH 406 is treated as a Multicast GID when a plurality of bits indicating the type field of the DGID has a specific pattern. In one example, the type field may include 8 bits and if the type field bits are set to 1 then that identifies the DGID as a Multicast GID. The type field may be followed by a plurality of flag bits, (for example, 4 bits). One of the plurality of flag bits may be used to indicate if the Multicast GID is a permanently assigned GID or temporarily assigned GID (or transient GID). For example, a value of 0 may be used to indicate that the Multicast GID is permanently assigned, and a value of 1 may be used to indicate that the multicast GID is temporarily assigned. The plurality of flag bits may be followed by a plurality of bits indicating the scope (or range) of the Multicast GID, for example, link-local (within a subnet), site-local, organization-local, or Global. In one example, the scope bits may include 4 bits. The scope bits may be followed by a plurality of bits representing qualifiers for the Multicast GID. The qualifiers assist in routing packets and in one embodiment, a portion of the qualifier may be used as an address at a destination. In one example, 112 bits may be used to represent the qualifiers for the Mulicast GID. The other fields in GRH 406 for multicast packet may be similar to GRH 220A fields previously described above with respect to FIG. 2C.

Referring to FIG. 4B, the RMC Confirm packet 402 includes LRH, GRH 406, BTH, DETH and CRC fields similar to packet 402, except packet 404 does not include a data field.

Referring to FIG. 4C, the status field 408 of RMC packet 404 may include a portion (or field) for indicating an error 410 and a portion (or field) for indicating a count 412. FIG. 4D shows an example of the various errors that may be reported in field 410. For example, error field 410 may include a plurality of flags to indicate a Missed Ack packet 414, PSN error (endpoint) 416, Link-down (endpoint) 418, link down (router) 420, link-down (switch) 422, Timeout (endpoint) 424, timeout (router) 426 and Timeout (switch) 428. The RMC Ack/Nack packet in one embodiment may include a count of number of replications made at an endpoint, to indicate the number of members of its group. For example, the status 408 field of the RMC Ack/Nack packet 404 may include the count of number of replications made at the endpoint.

FIG. 4E shows a plurality of fields in count 412. For example, count 412 may include a count of members Ack 430, count of PSN error 432, count of endpoint timeouts 434, count of link-down at an endpoint 436, count of timeout at a switch/router 438 and count of link down at a switch/router 440. Optionally reserved fields may be provided for future use.

In one example, an endpoint sends a RMC Ack packet or RMC Nack packet to a source, as an acknowledgement for a corresponding RMC data packet or a RMC Confirm packet received from the source. RMC Ack packet 404 is sent to indicate a successful receipt of a RMC packet. An RMC Nack packet 404 is sent to indicate unsuccessful receipt of a RMC packet. In one embodiment, the RMC Ack packet and RMC Nack packet 404 are configured to be backwards self routing, i.e. the RMC Ack/Nack packet 404 retrace the route taken by the corresponding RMC data packet or RMC Confirm packet from the source to the endpoint. By following the same route backwards, the status (states) held in the adapters along the path can be updated (unwound), which enables concatenation or consolidation of acknowledgement packets, as described below. Configuring a RMC Ack/Nack packet 404 to be backwards self routing may be accomplished in numerous ways, for example, (a) by swapping the SLID and DLID fields; (b) by swaping the SLID with the DLID and using a predefined "return" SLID; or (c) by using a special unicast DLID reserved for all RMC acknowledgements, coupled with sending an endpoint's normal SLID, and swapping the SGID and DGID of a received packet, for example, the RMC data packet 400.

Figure 5:
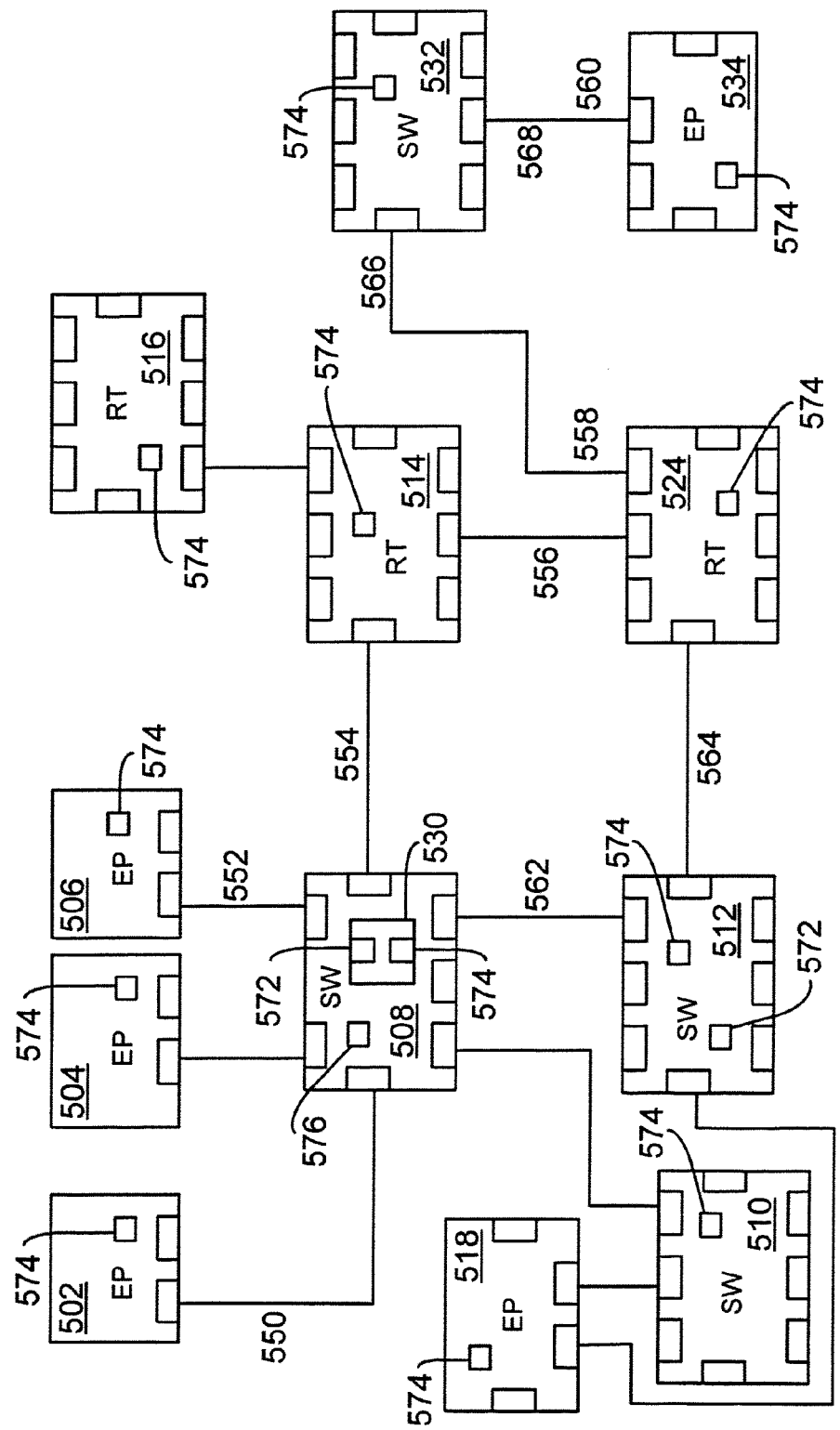
FIG. 5 shows a block diagram of a network system for use with an embodiment of the disclosure.

System for Reliable Multicast Message Transmission:

FIG. 5 shows a system for transmitting RMC messages, according to one embodiment. The system includes one or more endpoints, for example, 502, 504, 506, 518 and 534. The system may also include one or more adapters 508, 510, 512, 514, 516, 524 and 532 with one or more ports. An adapter in this context may be a switch or a router. In this example, adapters 508, 510, 512 and 532 operate as switches, while adapters 514, 516 and 524 operate as routers. Each port of an adapter may include a receive and transmit segment (or port) to receive and send packets. The adapters may also include logic for address decoders (not shown) to decode the address of the received packets. Typically, the address decoders are present in the receive segment. The address decoders may be implemented in hardware, software or a combination thereof.

Endpoints 502, 504 and 506 may be operationally coupled to adapter 508. Endpoint 534 is operationally coupled to adapter 532. In this example, endpoints 502, 504, 506 and 518 are within the same subnet. One or more ports of the adapter 508 may also be operationally coupled to additional switches within the same subnet. For example, switch 510 and 512 may be operationally coupled to adapter 508.

Switch 510 and 512 may be operationally coupled to one or more endpoint, switch and router. For example, a port of switch 510 may be operationally coupled to endpoint 518. One or more ports of an adapter may also be operationally coupled to one or more adapters in a different subnet. For example, a port of adapter 508 may be operationally coupled to router 514 and a port of router 514 may be coupled to router 516.

Routers 514 and 516 may be operationally coupled to one or more endpoints, switches or routers. For example, a port of router 514 may be operationally coupled to router 524. An endpoint may be operationally coupled to adapter 508 via one or more links. For example, a port of switch 512 is operationally coupled to router 524, thereby potentially providing two paths to endpoint 534; first, from adapter 508 to router 514 to router 524 to switch 532 and then to end point 534; and second, from adapter 508 to switch 512 to router 524, to switch 532 and then to endpoint 534.

Figure 5A:
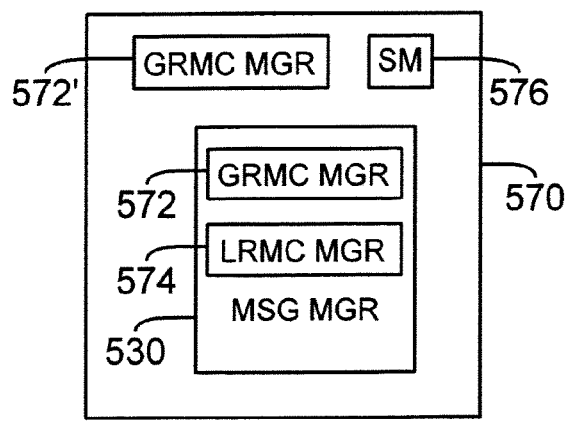
FIG. 5A shows a device with a RMC message manager, according to an embodiment of the disclosure.

FIG. 5A shows an implementation of a RMC message manager 530 in a device 570, according to one embodiment. Device 570 may be a switch, a router or an endpoint. RMC message manager 530 may include a Global RMC Manager (GRMC Manager) 572 component (or module, used interchangeably) and a Local RMC Manager (LRMC Manager) 574 component.

GRMC Manager 572 typically performs operational and management functions like creation, maintenance, deletion and communication functions at a RMC group level for a fabric. The LRMC Manager 574 typically performs operational and management functions like tracking, decoding and communication function on the RMC data flows at a device level.

LRMC Manager 574 may be located in a switch, router and endpoint. GRMC Manager 572 may be located in a device or an adapter that has access to the fabric. For example, the GRMC Manager 572 may be located in a switch, router or an endpoint. GRMC Manager 572 may be implemented with redundancy. For example, multiple GRMC Managers 572 may be operational at the same or different locations, each maintaining the same state as a primary GRMC Manager 572. The network system may provide for initiating multiple GRMC Managers 572 and one of them may be chosen as the primary GRMC Manager 572 through a polling selection process. The primary GRMC Manager role may be switched between a plurality of GRMC Managers 572. For example, GRMC Manager 572' is a redundant GRMC Manager in device 570.

LRMC Manager 574 communicates with GRMC Manager 572 to facilitate communication of RMC packets. The LRMC Manager 574 in one device may communicate with LRMC Managers 574 in other devices. The LRMC Manager 574 and GRMC Manager 572 also communicate with Subnet Manager 576 for transmitting RMC packets in the system. A primary GRMC Manager 572 may also communicate with other redundant GRMC Managers 572 to maintain a consistent state for all GRMC Managers 572.

Some of the functions performed by GRMC Manager 572 may include control, creation and maintenance of RMC groups within a fabric. For example, the setting up, tearing down and modification of routing tables in switches and routers, communicating with Subnet Manager 576 to perform the setting up, tearing down and modification of routing tables in switches and routers as appropriate; setting up policies within devices for example, for a RMC group, such as self pruning; addition of new members to a RMC group; removal of member/s from a RMC Group; communicating changes in the RMC group membership to other RMC group members; receiving and handling error signals received from LRMC Managers 574 and taking corrective action according to policies for a RMC group, including, forcing an alternate path, informing RMC group members of a possible problem, communicating with the Subnet Manager 576 to identify a problem and find alternate routes; and communicating changes to other alternate GRMC Managers, for example, redundant GRMC Manager 572'.

Some of the functions performed by LRMC Manager 574 may include creating tables related to RMC groups, as directed by the Subnet Manager 576 or GRMC Manager 572 and manage communication of RMC packets. For example, as part of managing communication of RMC packets, LRMC Manager 574 manages flow of RMC data packets; RMC Ack/Nack packets and RMC Confirm packets. LRMC Manager 572 for a switch or a router may keep track of responses for an outbound packet on a per PSN basis (i.e., an RMC packet transmission from a source to a destination, including an RMC data packet with information or an RMC Confirm packet). For an inbound packet (i.e., an RMC packet received from a destination, for example, an RMC Ack/Nack packet) the LRMC Manager 574 may perform the following: (a) keep track of packets on a flow-PSN basis; (b) handle errors, identify lost or missing responses; (c) retransmit lost packets if a copy is available; (d) prune or remove a destination from a list, for example, a MGID group; (e) track timeouts on flow-PSN; (f) report errors to GRMC Manager per policy; and (g) consolidate acknowledgments (for example, ACKs and NACKs), when all the acknowledgments have been received for a flow/PSN and send a consolidated acknowledgment with status to a source.

As part of managing communication of RMC packets (for example, RMC data packets and RMC Confirm packets) at an endpoint, LRMC Manager 574 at a source endpoint (for example, in source endpoint 502 of FIG. 5) may keep track of local loop communication (for example, applications or instances within the endpoint 502 that are part of a group identified by a given MGID) and send an acknowledgement indicating delivery completion for the RMC packets within the local loop. The LRMC Manager 574 at a destination endpoint (for example, destination endpoint 534 of FIG. 5) may validate a received RMC packet as a reliable multicast packet against an expected PSN; and deliver the data within the RMC packet as appropriate to the members of the RMC group within the endpoint, (for example, applications or instances within the endpoint that are part of the group identified by a given MGID).

The LRMC Manager 574 may further generate and transmit RMC Ack packets or RMC Nack packets as appropriate. In one embodiment, as part of generating the RMC Ack/Nack packets, the LRMC Manager 574 may swap the DLID and the SLID with each other, or use any other form described earlier to configure the RMC Ack/Nack packets to be self routing backwards so that the RMC Ack/Nack packet follows the same path through the fabric, passing through the same adapter, switches and routers that the RMC data packet corresponding to the RMC Ack/Nack packet previously passed through. By routing RMC Ack/Nack packets backwards through these adapters, the RMC Ack/Nack packets communicate to the adapters in the path that the packet is an RMC acknowledgement packet for an RMC data packet that was previously sent by or through those adapters. In another embodiment, the LRMC Manager 574 may swap the DGID and SGID values with each other, in the GRH field.

In yet another embodiment, the LRMC Manager 574 generates a RMC Ack and/or RMC Nack packet with a status field indicating the number of group members within the endpoint that the data was delivered to.

In one embodiment, there may be limited number of MLID slots or addresses within a fabric or a subnet. To provide a greater number of multicast groups, an MLID can be chosen by the GRMC Manager 572 that may include endpoints that are not part of a given multicast group. This scenario is generally identified as MLID overload. Thus, an endpoint that is not part of a given multicast group may be part of a shared MLID due to MLID overload. Thus, based upon the MLID, an endpoint may receive an RMC packet targeted for a given MGID group even if the endpoint is not part of that MGID group. Upon receipt of a RMC packet, an endpoint will decode the MGID of the RMC packet to determine if the endpoint belongs to the multicast group identified by the MGID. If the endpoint does not belong to the multicast group identified by the MGID, the endpoint recognizes that the RMC packet was received due to shared MLID caused by MLID overload. The endpoint will ignore the RMC packet, yet send an RMC Ack/Nack packet to the adapter so that the adapter can keep track of the status of the packets sent. In one embodiment, the LRMC Manager 574 of the endpoint generates the RMC Ack packet and sends the RMC Ack packet to the adapter.

By way of example, an implementation of the message manager 530 will now be described with respect to FIG. 5. In one embodiment, the message manager 530 may be located in adapter 508 and includes GRMC Manager 572 and LRMC Manager 574. Endpoints 502, 504, 506, 518 and 534 may each include a LRMC Manager 574 and communicate with the GRMC Manager 572 of adapter 508. Switches 510, 512 and 532 may each include a LRMC Manager 574 and may also communicate with the GRMC Manager 572 of adapter 508. Routers 514, 516 and 524 may each include a LRMC Manager 574 and communicate with the GRMC Manager 572 of adapter 508. In one embodiment, LRMC Manager 572 in one device, for example, endpoint 534 may communicate with LRMC Manager 572 of other devices, for example, switch 523. In another embodiment, switch 512 may include an alternate, redundant GRMC Manager 572, while the GRMC Manager 572 of adapter 508 acts as the primary GRMC Manager.

The message manager 530, GRMC Message Manager 572 and LRMC Message Manager 574 functionality may be implemented in hardware, software or a combination of hardware and software. Further, a message manager 530 in an endpoint, switch or a router may include the LRMC Message Manager 574, which communicates with a GRMC Manager 572 located in a different device, for example another endpoint, switch or router.

Figure 6A:
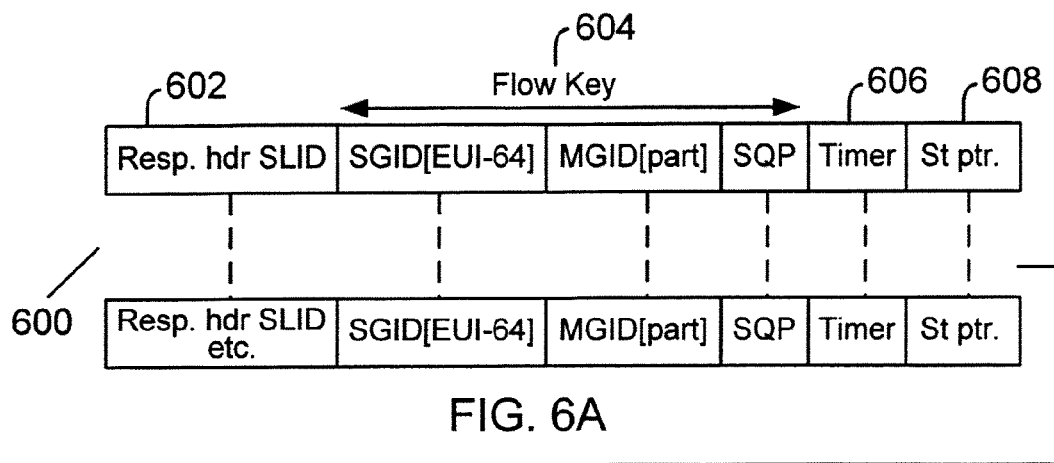
FIGS. 6A and 6B show an example data structure for use in a switch or a router supporting RMC transmission, according to an embodiment of the disclosure.
Figure 6B:
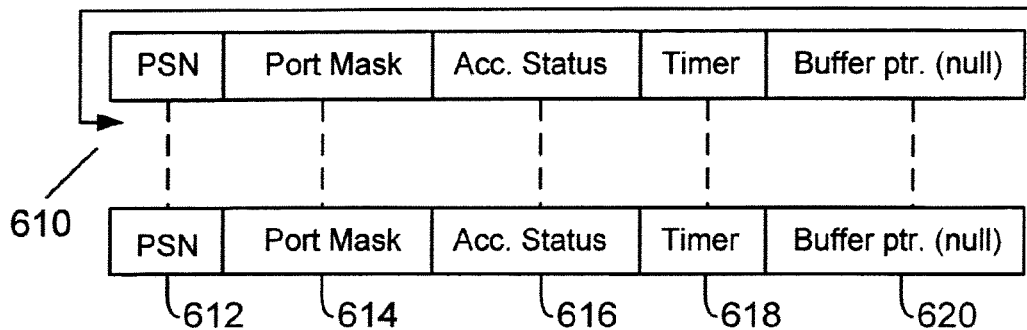

FIGS. 6A and 6B show examples of possible data structures for use in a switch or a router supporting reliable multicast transmission. For example, LRMC Manager 574 of a switch or a router may use the data structure described with reference to FIGS. 6A and 6B to track and process the RMC packets received at a switch or a router. FIG. 6A shows a message data structure 600 stored in a LRMC manager 574. Message data structure 600 may include a field to store a Response Header SLID 602, Flow Key 604, which is a unique indicator for a source, a timer field 606 and a straight (st) pointer 608, that points to the context for a RMC packet for a specific flow. There may be multiple packets outstanding with different PSNs with the same flow key within the fabric. This enables transmission of multiple outstanding messages from the same source to the same multicast group, before the source receives a status message from adapter 508. The OpCode field in the RMC packet defines the boundaries between messages, which will be described later.

Now referring to FIG. 6B, each of the packets 610 of the message data structure 600 may be represented by a Packet sequence number (PSN) 612, Port Mask 614, Accumulate (Acc.) Status 616, Timer 618 and buffer pointer 620. The buffer pointer 620 may point to the location of a memory buffer (not shown) where a copy of the RMC packet 550 previously transmitted is stored for potential future retransmission. Memory buffer may be located in an adapter or any other location.

Figure 7A:
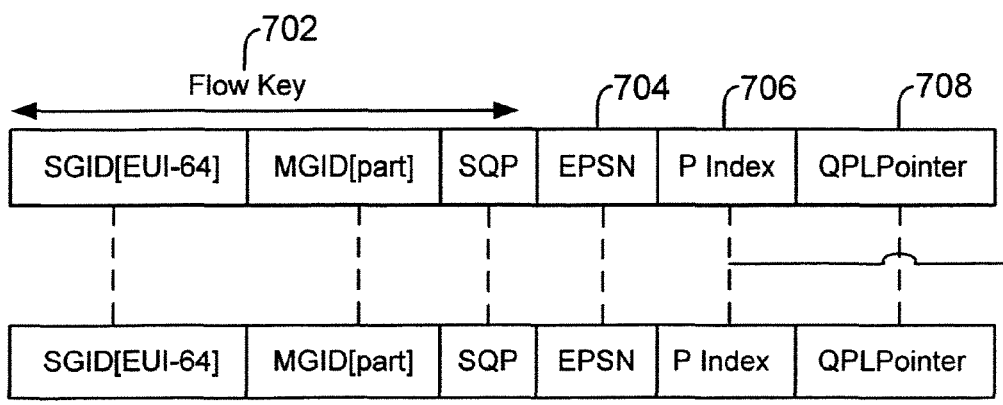
FIGS. 7A and 7B show an example data structure for use in a destination endpoint supporting RMC transmission, according to an embodiment of this disclosure.
Figure 7B:
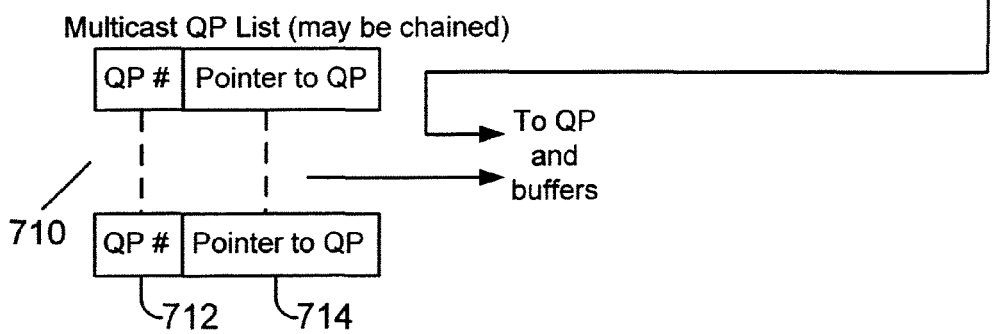

FIGS. 7A and 7B show a possible data structure for use by a destination endpoint supporting reliable multicast transmission. For example, LRMC Manager 574 at a destination end point may use the data structure described with reference to FIGS. 7A and 7B to track and process the RMC packets received at a destination endpoint. In one embodiment the end point data structure 701 may include a Flow Key 702, EPSN (expected next PSN) 704, P_Index 706 (which is an index into a QP receive list if there are more than one multi-packet messages from different endpoints arriving at the same destination endpoint), QPL Pointer 708 and a QP list pointer for a Multicast Group.

Each QPL Pointer 708 may point to a Multicast QP List 710 shown in FIG. 7B. The Multicast QP List 710 may be chained. If chained, the Multicast QP List 710 may include the QP#712 and a pointer to a next QP 714.

RMC Packet Transmission: RMC packet transmission from an adapter to an endpoint will now be described, with reference to FIGS. 4 and 5, according to one embodiment. Adapters, for example, switches and routers may use the exemplary data structure described with reference to FIGS. 6A and 6B to monitor and process the RMC packets. Endpoints may use the exemplary data structure described with reference to FIGS. 7A and 7B, as appropriate, to monitor and process the RMC packets. During fabric initialization, GRMC Manager 572 in adapter 508 creates and maintains RMC groups within a fabric. The GRMC Manager 572 communicates with LRMC Managers 574 in switches, routers and endpoints to set up and initialize appropriate registers and tables. The GRMC Manager 572 sets up the routing tables in switches and routers and communicates with the subnet manager 576. The GRMC Manager 572 also sets up the policies for a given RMC group in the switches, routers and endpoints. The policies may be communicated to the LRMC Managers 574 of an RMC group. The GRMC Manager 572 also communicates with a redundant GRMC Manager 572, for example, in switch 512 to maintain a standby GRMC Manager if needed.

In one embodiment, the RMC packets are injected from an endpoint. For example, RMC packet 550 to be multicast to a multicast group may be sent by endpoint 502. RMC packet 550 conforms to the RMC data packet 400 format as previously described with respect to FIG. 4A. The LRMC Manager 574 of endpoint 502 checks to see if there are any applications or instances within endpoint 502 that are part of the MGID. If so, the RMC packet 550 is sent to those applications and instances. The LRMC Manager 574 of endpoint 502 keeps track of the acknowledgements received from applications or instances within the endpoint 502.

Adapter 508 receives, checks and then identifies the RMC packet 550. This can be accomplished in multiple ways. In one embodiment, a unique OpCode may be used to identify the packet as a RMC packet. For example, the BTH field of the RMC packet 550 may include a pre-defined OpCode to identify the packet as a RMC packet. In an alternate embodiment, the presence of a bit pattern in the MGID or a QP with a specified value such as 0xfffff0 may be used to identify the packet as a RMC packet. 0xfffff0 is different from a QP value of 1's that is typically used to identify an unreliable multicast packet. In another embodiment, two fields may be used in the OpCode to identify the RMC packet. One of the fields may be the OpCode type, which indicates message/connection type, for example, an RMC message. The second field may define the packet characteristic such as the only packet in the message, the first, middle or last of the multicast message or acknowledgement. Decoding of the second field of the OpCode will indicate if the message is a new message or if the packets are part of a sequence of packets for a given message. In one embodiment, the LRMC Manager 574 of the adapter 508 processes the RMC packet 550.

Once the LRMC Manager 574 for adapter 508 identifies packet 550 as a RMC packet, the LRMC Manager 574 builds an entry for a Flow Key (for example, Flow Key 604 as shown in FIG. 6A and PSN along with an entry port identification for the RMC packet 550. The hop-count in the BTH field using currently reserved fields may be used by the LRMC Manager 574 to create a timeout value for Flow Key 604 and PSN 612. Alternatively, the timeout value may also be generated from the packets SLID. In one embodiment, field 606 (FIG. 6A) stores the time out value for Flow Key 604 and field 618 stores the timeout value for PSN 612. The LRMC Manager 574 reviews the RMC packet 550 and sends the RMC packet to egress ports for the multicast group. For example, if endpoint 506 is a member of an RMC group, then adapter 508 forwards the RMC packet 550 to endpoint 506 as packet 552. The adapter 508 also forwards the RMC packet 550 to the wire, for transmission to other switches and routers, for transmission within the subnet and across subnets, based upon the MLID of the RMC packet 550.

In one embodiment, the hop count in the RMC packet 550 may be decremented by 1 as it is transmitted to an egress port. Each subsequent switch or a router may decrement the hop count, as the packets are processed and forwarded. When the hop count reaches zero, it indicates that time out has occurred and the switch or a router that decrements the hop count to zero sends a RMC Nack packet to source 502. The LRMC manager 574 also receives the RMC Nack packet and processes the RMC Nack packet as appropriate, for example as part of error recovery mechanism. This may indicate that either the RMC packet did not get to one or more of the destinations. This may be due to transitory failure on a link, device failure within the group or that Ack/Nack packets were lost.

When a RMC packet reaches a router, the LRH is stripped from the RMC packet and is stored by the LRMC manager 574 along with the Flow Key and the PSN. In one embodiment, the message data structure 600 and packets 610 of the message data structure 600 may be used to store the Flow Key and the PSN. The LRMC Manager 574 in the router may use the hop-count to derive a timeout for the extracted Flow Key-PSN combination. The timeout value for the Flow Key may be stored in the Timer 606 of the message data structure and timeout value for the PSN may be stored in the Timer 618 field of the packet 610. The RMC packet hop-count is decremented by one and the RMC packet is forwarded. For example, if packet 550 needs to be sent from endpoint 502 to the endpoint 534, the packet may be sent via routers 514, 524 and switch 532. The packet 550 is sent to router 514 as packet 554. The LRMC manager 574 in router 514 will decrease the hop count of the packet 554 by one when it is sent to router 524 as packet 556. The LRMC manager 574 in router 524 will decrease the hop count of the packet 556 by one when the packet 556 is sent to switch 532 as packet 558. Switch 532 forwards packet 558 to the destination endpoint 534 as packet 560.

In one embodiment, an adapter may discard a RMC packet if the PSN value for the packet is less than the expected value. For example, switch 532 may discard packet 558, if the PSN value for the packet 558 is less than the expected value. If the PSN value is within an acceptable range, the packet 558 is forwarded to end point 534 and an RMC Ack packet may be sent to the source endpoint 502 via adapter 508, upon receipt of RMC Ack packet from the endpoint 534. If the PSN value is greater than expected, the adapter 532 sends a RMC Nack packet to adapter 508 for the missing packets including the packet that was received.

As previously described, in one embodiment, the RMC Ack/Nack packet are configured to be self routing backwards, for retracing a path previously taken by a corresponding RMC data packet. As an RMC Nack packet retraces the path through the fabric, switches or routers in the path that have a copy of the missing packet (for example, corresponding RMC data packet that passed through a switch or router on its way to a destination endpoint and saved in the switch or router) may resend the missing packet to adapter 532, instead of sending RMC Nack packets to adapter 508 or the source 502. In one embodiment, the LRMC Manager 574 in the switch or router checks the RMC Nack packets as they pass through and resends the missing packet to the adapter or endpoint that sent the RMC Nack packet, if the missing packet is stored in the buffer of the LRMC Manager 574. The RMC Ack/Nack packet may include a count of number of replications made at an endpoint, to indicate the number of members of its group. For example, the status 408 field of the RMC Ack/Nack packet 404 may include the count of number of replications made at the endpoint.

At a destination endpoint (for example, endpoint 534), the LRMC Manager 574 generates a key corresponding to a destination address details of packet 560; and checks to determine if the received PSN is the expected PSN. If the received PSN is the expected PSN, LRMC Manager 574 of endpoint 534 uses the MGID (of GRH field 406) to identify the QP's to which the data packet should be sent. For a first RMC data packet for a flow received at end point 534, the LRMC Manager 574 initializes a key table with the Flow Key and received PSN. The PSN is incremented by one (next expected number), for the next packet to be received for this flow. In one embodiment, a key table may conform to the endpoint data structure 701 described with reference to FIGS. 7A and 7B. In one embodiment, the key table is created and maintained in an adapter.

On receipt of an RMC packet, the LRMC Manager 574 for an endpoint (for example, 534) issues an RMC Ack packet, if the RMC packet is valid; or issues a RMC Nack packet if the RMC packet is not valid. As previously described, an endpoint may receive a RMC packet even if the endpoint is not part of the multicast group identified by the MGID, due to an MLID overload condition.

If an RMC packet is part of a multi-packet RMC message, the flow key mechanism may maintain an index, which is used by the destination QPs to identify a partial buffer to be used for a given flow. As previously described with reference to FIGS. 7A and 7B, in one embodiment, the fields of the endpoint data structure 701 may be used by the endpoint to process multiple packets of a RMC message. In one embodiment, the LRMC Manager 574 of an endpoint may use the endpoint data structure 701 to monitor and process multiple packets of a multi-packet RMC message. If a QP has just joined a multicast group in say, endpoint 534 and it receives a partial message (for example, a middle packet of a multi-packet message), it may discard the message. However, an RMC Ack packet is returned to switch 532 for the partial message, so that the switch 532 updates the status for the RMC packet and unrolls its context.

In one embodiment, the LRMC Manager 574 for endpoint 534 may only send a RMC Nack packet in response to a received packet. The sending switch, in this example, adapter 508 (or the sending source, for example, endpoint 502) assumes that all earlier packets with lower PSNs sent to endpoint 534 and not previously acknowledged by endpoint 534 are not acknowledged (or Nacked). For example, earlier RMC Nack packets sent by the endpoint 524 for lower PSNs might have been lost. Conversely when the adapter receives an RMC Ack packet for a higher PSN, the adepter assumes that an RMC Ack packet has been received for all lowers PSN's that may be outstanding for a Flow Key.

RMC Confirmation Packets: RMC confirmation packets may be sent by a source that sent a RMC message packet. The RMC confirmation packets are sent by the source to receive a status on the RMC packets previously transmitted. A confirmation packet may include a PSN of the last packet sent for a particular flow. In one embodiment, the confirmation packet may conform to the RMC Confirm packet 402 format described above with respect to FIG. 4B. As an example, endpoint 502 may send a RMC Confirm packet 402 to a multicast group and await acknowledgement from the multicast group destinations. Upon receipt of the RMC Confirm packet 402, the destinations respond by sending an RMC Ack packet or a RMC Nack packet back to endpoint 502, as appropriate.

In one embodiment, the RMC Confirm packets may not be sent to egress ports that have already responded with an RMC Ack packet. An end point responds to a RMC Confirm Packet with a RMC Nack packet if it has not received the packet, thereby permitting retransmission of the data packet or the message before a time out occurs.

A source, for example, endpoint 502 may also send a RMC confirmation packet, based on a timer that may be shorter than a flow key timeout used by a message manager. RMC confirmation messages may be sent by an endpoint that is not expecting to send data on that flow key for a while. By sending an RMC confirmation packet when there is a delay in sending subsequent packets, the source can force an RMC Ack/Nack packet from destinations and identify potential problems. If the source is sending periodic data packets, the RMC Ack/Nack packets received from the destinations for those packets provides an indication of potential problems and need for sending an RMC confirmation packet may be minimized, based upon the application.

Packet Acknowledgement: Endpoints acknowledge every data packet or confirmation packet they receive. In one embodiment, the ACK packet may conform to the RMC Ack packet 404 format described with reference to FIG. 4C.

In one embodiment, a multicast port mask (which may be a list or a bit map) is maintained and updated by LRMC Manager 574 for an adapter. The multicast port mask indicates which egress ports the packets were sent. FIG. 6B shows an example of port mask 614. After an RMC Ack or RMC Nack packet is received, the multicast port mask is updated to indicate receipt of the RMC Ack/Nack packets. The LRMC Manager 574, for example, for adapter 508, accumulates the received RMC Ack packets and RMC Nack packets and then updates the multicast port mask. The LRMC Manager 574 also accumulates statistics (for example, status information in the status field 408 of packet 404 (FIG. 4B) within the RMC Ack/Nack packet. In one embodiment, the Acc. Status 616 field of the packet 610 of the message data structure 610 may be used to accumulate and store the status of the received RMC Ack/Nack packets.

Once the LRMC Manager 574 for adapter 508 has received all the expected RMC Ack/Nack packets (for example, when multicast bit map becomes zero, if the bit map was set to one when the packets were sent), it will send a consolidated delivery status for the message. For example, adapter 508 sends a single Ack/Nack packet on the port that the original flow was received (for example, the port operationally coupled to endpoint 502), with an updated aggregated count of acknowledgements (Acks) and possibly negative acknowledgements (Nacks). In one embodiment, each of the adapters that forwarded a RMC packet to a downstream adapter (or an endpoint) monitor and collect delivery status for the RMC packet, upon receipt of a corresponding RMC Ack/Nack packet. Once the adapters have received all the expected RMC Ack/Nack packets, they send a consolidated delivery status for the message. For example, the adapters may send a single Ack/Nack packet on the port that they originally received RMC packet.

In one embodiment, an adapter, for example, adapter 508 may maintain an internal key table to keep track of the receipt of RMC Ack/Nack for each packet that is sent. For example, a status field in the key table is marked or set when a packet is sent and the status field is reset when a corresponding RMC Ack/Nack packet for the packet that was sent is received. Checking the status field indicates that an acknowledgement has been received for the packet from the destination, at the source adapter 508.

In one embodiment, if an RMC Ack packet or a RMC Nack packet is received for a PSN for a given Flow Key at an adapter, for example, adapter 508, before an RMC Ack/Nack packet for one or more earlier PSNs, then the RMC Ack/Nack packets for the earlier PSNs are assumed to be lost. If the received packet is an RMC Ack packet, then the previous PSN is assumed to have been received successfully and the previous PSN is marked as being acknowledged. If the received packet is an RMC Nack packet, then the previous PSN is assumed to have been Nacked (or not acknowledged). When the adapter receives a RMC Nack packet and the adapter 508 has saved the data packet corresponding to the PSN in the RMC Nack packet, then the adapter 508 resends the data packet to the port that sent the RMC Nack packet and marks the corresponding Port Mask or the key table to indicate that the adapter 508 is still waiting for an RMC Ack packet. In one embodiment, the adapter keeps track of a number of retransmissions of data packets and will abort after a preset number of retries.

Error Handling:

Various error handling mechanisms may be provided for transmission of RMC packets, according to one embodiment. For example, if a link is down, then a RMC Nack packet is generated and the port may be pruned or removed from a multicast route. For example, if the link between router 514 and router 524 is down, then LRMC Manager 574 for router 514 generates a RMC Nack packet setting an appropriate error flag and sends it to adapter 508. Adapter 508 can take appropriate action including pruning the port from the multicast route. The GRMC Manager 572 is notified, if pruning is performed. In one embodiment, the LRMC Manager 574 for router 514 may prune the port from the multicast group and inform the LRMC Manager 574 and the GRMC Manager 572 for adapter 508.

If a RMC data packet sent to a port times out, due to an unresponsive device, then the port may be Nack'ed and the port may be pruned from a multicast group. For example, if a packet sent from router 514 to router 524 times out, then router 514 sends a RMC Nack packet with an appropriate error flag and adapter 508 takes the appropriate action, which may include pruning the port from the multicast group.

In yet another embodiment, an error-handling mechanism may include endpoints sending RMC Ack packets with an appropriate error flag to indicate errors within a fabric. In this case, the adapter may switch to an alternate MLID and MGID, reaching the same endpoints by using a different path. In one embodiment, both the current MGID and an alternate MGID may both belong to the same RMC group. This will advantageously permit packet flow to a given destination using an alternate path. Switching to an alternate MLID and MGID may be performed before reporting the deliver results of the RMC packets to the source. For example, if an end point 518 responds with RMC Ack packets with error after packets are received from switch 510, an alternate switch 512, which is operationally coupled to end point 518 may be used to route the packets instead of switch 510.

In yet another embodiment, errors may be forwarded to an application running on a device. The application may evaluate errors and identify the extent of problems within a fabric. The application may also take corrective action based upon the extent of problem like, reaching a threshold percentage of successful transmission. For example, adapter 508 may send a RMC Ack/Nack packet with error details to endpoint 502, upon reaching or exceeding a threshold percentage of successful transmission. An application at endpoint 502 may evaluate the error details and determine a corrective action. The error details may be evaluated using the information communicated in status 408 field of the RMC Ack/Nack packet 404.

In yet another embodiment, if reliable multicasts to certain endpoint have been automatically pruned or removed, a source application may not retry to send packets again.

Figure 8:
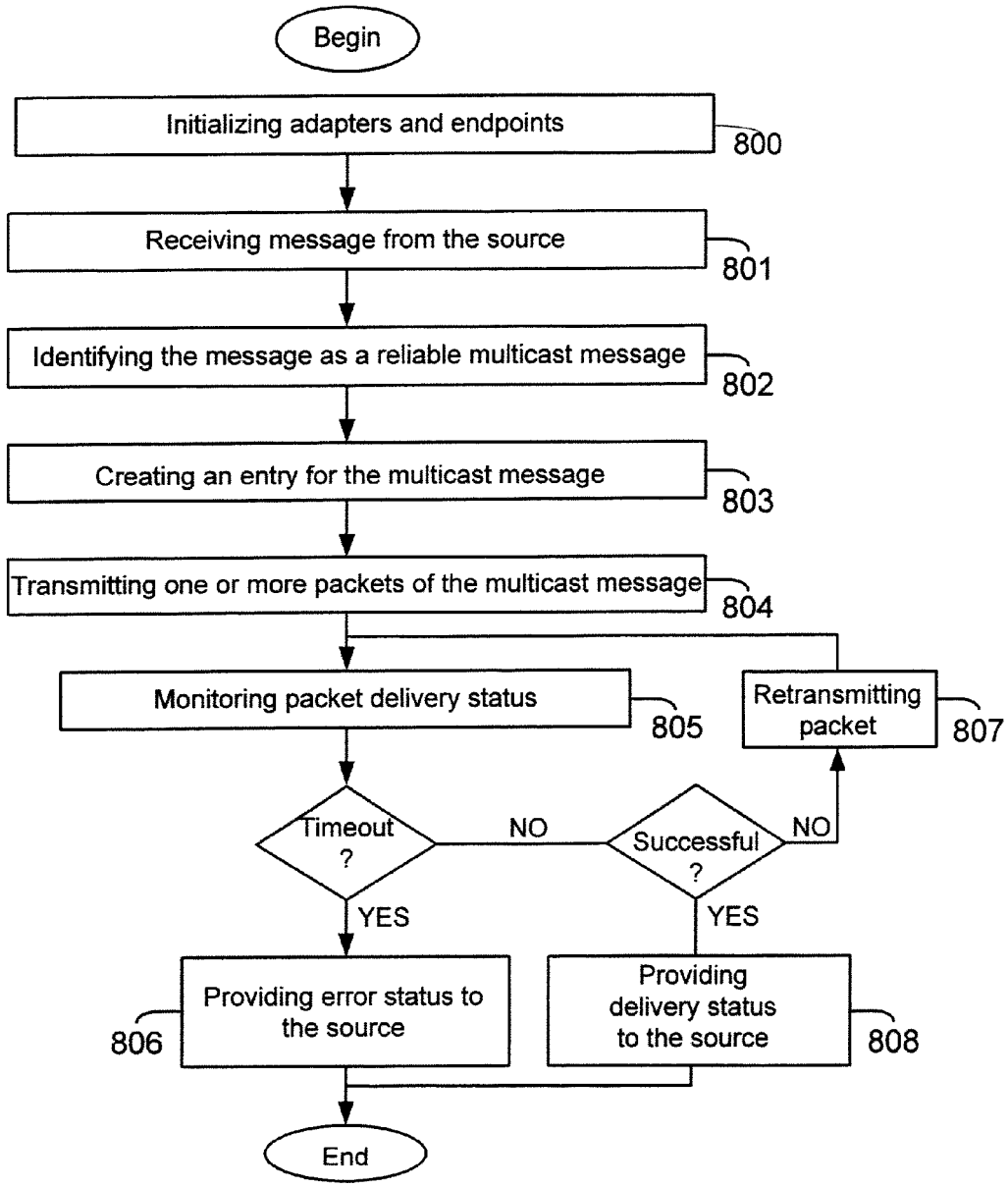
FIG. 8 shows a flow diagram for RMC transmission, according to an embodiment of this disclosure.

Overall Process Flow:

FIG. 8 shows a process flowchart for transmitting reliable multicast messages, according to one embodiment. In step 800, adapters and endpoints of various multicast groups are initialized. The adapters may include switches and routers. In one embodiment, the list of members for various multicast groups may be initialized and maintained in the GRMC Manager 572 of an adapter, for example, adapter 508 and the list of members are initialized and maintained in LRMC Manager 574 of switches, routers and endpoints as appropriate. The list of members for various multicast groups may be used to decode and determine the multicast group a multicast message belongs to.

In step 801, a message is received from a source. For example, adapter 508 may receive a RMC packet 550 from source 502. The RMC packet 550 may conform to the RMC data packet format 400 as described above with respect to FIG. 4A or a RMC confirm packet 402 as described above with respect to FIG. 4B.

In step 802, the received message is identified as a RMC packet, by decoding the RMC packet. For example, adapter 508 decodes the received message and identifies the message as a RMC packet. In one embodiment, a unique OpCode may be used to identify the packet as a RMC packet. For example, the BTH field of the RMC packet 550 may include a predefined OpCode to identify the packet as a RMC packet. In an alternate embodiment, the presence of a bit pattern in the MGID or a QP with a specified value such as 0xffff0 may be used to identify the packet as a RMC packet. 0xffff0 is different from a QP value of 1's that is typically used to identify an unreliable multicast packet. In another embodiment, two fields may be used in the OpCode to identify the RMC packet. One of the fields may be the OpCode type, which indicates message/connection type, for example, an RMC message. The second field may define the packet characteristic such as the only packet in the message, the first, middle or last of the multicast message or acknowledgement. Decoding of the second field of the OpCode indicates if the message is a new message or if the packets are part of a sequence of packets for a given message.

In step 803, the adapter creates an entry for the RMC packet 500. For example, the LRMC Manager 574 of adapter 508 may create a data structure as previously described with respect to FIG. 6A. The LRMC Manager 574 builds an entry for a Flow Key (for example, Flow Key 604 as shown in FIG. 6A) and PSN. The LRMC Manager 574 also stores an entry for identifying the port for the received RMC packet. The LRMC Manager 574 may create a timeout value for the Flow Key 604 and the PSN 612. For example, the hop-count in the BTH field may be used to create the time-out value. Alternatively, the timeout value may also be generated from the SLID. In one embodiment, the timeout value for Flow Key 604 is stored in Timer field 606 and the timeout value for PSN 612 is stored as 618.

In step 804, the adapter transmits one or more packets of the multicast message through one or more egress ports. For example, adapter 508 decodes the address fields of an RMC packet and determines the multicast group for the message. Thereafter, the RMC packet is forwarded to its destination through one or more egress ports. In one embodiment, the list of members for the multicast group is determined by accessing a list maintained by LRMC Manager 574 of an adapter.

In step 805, adapter 508 monitors packet delivery status, by waiting for receipt of an RMC Ack or RMC Nack packet from the end points. In one embodiment, adapter 508 may use the data structure described with respect to FIG. 6B to monitor the packet delivery status. If RMC Ack packets or RMC Nack packets have not been received in a timely manner, a timeout may occur in step 805A. Adapter 508 uses a timer to determine if a timeout has occurred. If a timeout occurs in step 805A, then in step 806, the adapter may send an error status to the source. For example, adapter 508 may send a RMC Nack packet to the source 502.

If a timeout did not occur in step 805A, then in step 805B, the adapter determines if packet delivery was successful by reviewing the acknowledgment packet received by the adapter. The adapter may receive an RMC Ack packet if the packet delivery was successful or a RMC Nack packet if the packet delivery was not successful. If a RMC Nack packet is received, then in step 807, the adapter retransmits one or more RMC data packets corresponding to the packet for which the RMC Nack packet was received. For example, the LRMC Manager 574 of the adapter may maintain a copy of the packets in a buffer and the packets are resent. Thereafter, the process returns to step 805, where the adapter monitors the status of packet delivery.

In step 805B, if the adapter receives a RMC Ack packet, then in step 808, the adapter provides the delivery status for the message to the source. In one embodiment, the adapter waits for the delivery status for one or more packets of the message to all the destinations of the multicast group, consolidates the delivery status for the message and then provides the consolidated delivery status to the source.

As one skilled in the art appreciates, various embodiments disclosed herein may provide one or more of the following advantages. For example, in one embodiment, a source receives an acknowledgment for a multicast message sent to multiple destinations thereby providing reliable multicast transmission without using individual dedicated connections.

In another embodiment, a source may send additional multicast messages to multiple destinations, without waiting for an acknowledgment for a multicast message previously sent. This improves performance how multicast messages are sent and received.

In yet another embodiment, a source may send a multicast message with one or more packets to a multicast group. The endpoints of the multicast group may be within a subnet or distributed across multiple subnets.

In another embodiment, an adapter that receives a multicast message from a source or from another adapter may store a copy of the message for subsequent retransmission to a destination, upon receipt of negative acknowledgement from the destination. This providing an error recovery mechanism, which may be independent of the destination.

In yet another embodiment, a source may send a multicast message to one or more endpoints via one or more adapters, where the endpoints are coupled to one or more adapters. The adapters may consolidate a delivery status for the multicast packets sent to multiple destinations from the adapter. An adapter sends a consolidated status for the multicast message to another adapter that sent the multicast message. Therefore, the source receives a consolidated status message from the adapter that received the original multicast. This reduces the load on the source because it does not have to wait for individual status. This also reduces network traffic because status from each adapter does not have to travel to the source.

In another embodiment, the adapters may maintain a timer to track prompt receipt of acknowledgements to multicast messages.

In yet another embodiment, an adapter may infer the delivery status of a multicast packet for which an acknowledgement packet was lost based on the type of acknowledgement received for a subsequent multicast packet. This improves error recovery in the network system.

In another embodiment, a source may initiate a confirmation packet, to receive acknowledgement packet for a previously sent multicast message, before the adapter provides a consolidated delivery status for the previously sent message to the source. This allows a source to force a status instead of waiting for the adapters to consolidate the status. This improves overall network performance Although the present invention has been described with reference to specific embodiments, these embodiments are illustrative only and not limiting. Many other applications and embodiments of the present invention will be apparent in light of this disclosure and the following claims.

What is claimed is:

1. An adapter for processing a multicast message including one or more packets to be sent to a plurality of destinations, the adapter comprising:
 an entry port that receives the multicast message from a source for transmission to the plurality of destinations;
 at least one egress port that transmits the one or more packets of the multicast message to the plurality of destinations; and
 a message manager that monitors delivery status for the one or more packets of the multicast message to the plurality of destinations without using a plurality of dedicated individual connections between each of the plurality of destinations and the source, and sends a consolidated delivery status for the multicast message to the source after transmission of all the packets of the multicast message, wherein the message manager creates a data structure to track and process each of the packets, builds an entry for a flow key that is a unique identifier of a source of the multicast message and builds an entry for a packet sequence number upon receiving the multicast message;
 wherein the adapter is configured to receive an additional multicast message from the source for transmission to the destinations before the message manager provides the delivery status to the source for the multicast message previously received from the source.

2. The adapter of claim 1, wherein the message manager monitors delivery status for the one or more packets by tracking acknowledged (Ack) packets and not acknowledged (Nack) packets received from the plurality of destinations.

3. The adapter of claim 2, wherein when the message manager receives a Nack packet indicating that one of the one or more packets is missing, the message manager resends the missing packet to the destination that sent the Nack packet, if the missing packet is stored in a buffer of the message manager.

4. The adapter of claim 2, wherein each Ack packet includes a count of a number of replications of the packet corresponding to each Ack packet made at that packet's destination.

5. The adapter of claim 2, wherein the adapter maintains a multicast port mask that indicates through which of the egress ports each of the packets of the multicast message was sent.

6. The adapter of claim 5, wherein the adapter updates the multicast port mask when the Ack packets and the Nack packets are received from the plurality of destinations.

7. The adapter of claim 2, wherein the adapter maintains an internal key table to keep track of received Ack packets and Nack packets.

8. The adapter of claim 1, wherein the message manager creates a timeout value for the flow key and the packet sequence number.

9. A system for processing a multicast message including one or more packets to be sent to a plurality of destinations, comprising:
   an adapter including an entry port to receive the multicast message from a source for transmission to the plurality of destinations;
   one or more egress ports of the adapter that transmit the one or more packets of the multicast message to the plurality of destinations and receives acknowledgement for the one or more packets from the one or more destinations; and
   a message manager that monitors delivery status for the one or more packets to the plurality of destinations without using a plurality of dedicated individual connections between each of the plurality of destinations and the source, and sends a consolidated delivery status for the multicast message to the source after transmission of all the packets of the multicast message, wherein the message manager creates a data structure to track and process each of the packets, builds an entry for a flow key that is a unique identifier of a source of the multicast message and builds an entry for a packet sequence number upon receiving the multicast message;
   wherein the adapter is configured to receive an additional multicast message from the source for transmission to the destinations before the message manager provides the delivery status to the source for the multicast message previously received from the source.

10. The system of claim 9, wherein the message manager monitors delivery status for the one or more packets by tracking acknowledged (Ack) packets and not acknowledged (Nack) packets received from the plurality of destinations.

11. The system of claim 10, wherein when the message manager receives a Nack packet indicating that one of the one or more packets is missing, the message manager sends the missing packet to the destination that sent the Nack packet, if the missing packet is stored in a buffer of the message manager.

12. The system of claim 10, wherein each Ack packet includes a count of a number of replications of the packet corresponding to each Ack packet made at that packet's destination.

13. The system of claim 10, wherein the adapter maintains a multicast port mask that indicates through which of the egress ports each of the packets of the multicast message was sent.

14. The system of claim 13, wherein the adapter updates the multicast port mask when the Ack packets and the Nack packets are received from the plurality of destinations.

15. The system of claim 10, wherein the adapter maintains an internal key table to keep track of received Ack packets and Nack packets.

16. The system of claim 9, wherein the message manager creates a timeout value for the flow key and the packet sequence number.

17. A method for processing a multicast message from an adapter, the multicast message including one or more packets to be sent to a plurality of destinations, comprising:
   receiving the multicast message from a source at an entry port of the adapter for transmission to the plurality of destinations;
   transmitting the one or more packets of the multicast message through one or more egress ports to the plurality of destinations and receiving an acknowledgement for one or more of the packets from one or more of the plurality of destinations; and
   monitoring delivery status for the one or more packets to the plurality of destinations, wherein a message manager monitors the delivery status without using a plurality of dedicated individual connections between each of the plurality of destinations and the source, and sends a consolidated delivery status for the multicast message to the source after transmission of all the packets of the multicast message, wherein the message manager creates a data structure to track and process each of the packets, builds an entry for a flow key that is a unique identifier of a source of the multicast message and builds an entry for a packet sequence number upon receiving the multicast message;
   wherein the adapter is configured to receive an additional multicast message from the source for transmission to the destinations before the message manager provides the delivery status to the source for the multicast message previously received from the source.

18. The method of claim 17, wherein the message manager monitors delivery status for the one or more packets by tracking acknowledged (Ack) packets and not acknowledged (Nack) packets received from the plurality of destinations.

19. The method of claim 18, wherein when the message manager receives a Nack packet indicating that one of the one or more packets is missing, the message manager resends the missing packet to the destination that sent the Nack packet, if the missing packet is stored in a buffer of the message manager.

20. The method of claim 18, wherein each Ack packet includes a count of a number of replications of the packet corresponding to each Ack packet made at that packet's destination.

21. The method of claim 18, wherein the adapter maintains a multicast port mask that indicates through which of the egress ports each of the packets of the multicast message was sent.

22. The method of claim 21, wherein the adapter updates the multicast port mask when the Ack packets and the Nack packets are received from the plurality of destinations.

23. The method of claim 18, wherein the adapter maintains an internal key table to keep track of received Ack packets and Nack packets.

24. The method of claim 17, wherein the message manager creates a timeout value for the flow key and the packet sequence number.

* * * * *